April 19, 1966     D. E. DAVIDSON ETAL     3,246,543

INDEXING FIXTURE

Filed July 17, 1963     2 Sheets-Sheet 1

INVENTORS
DONALD E. DAVIDSON
RICHMOND J. HOCH
BY
*Forrest J. Lilley*
ATTORNEY

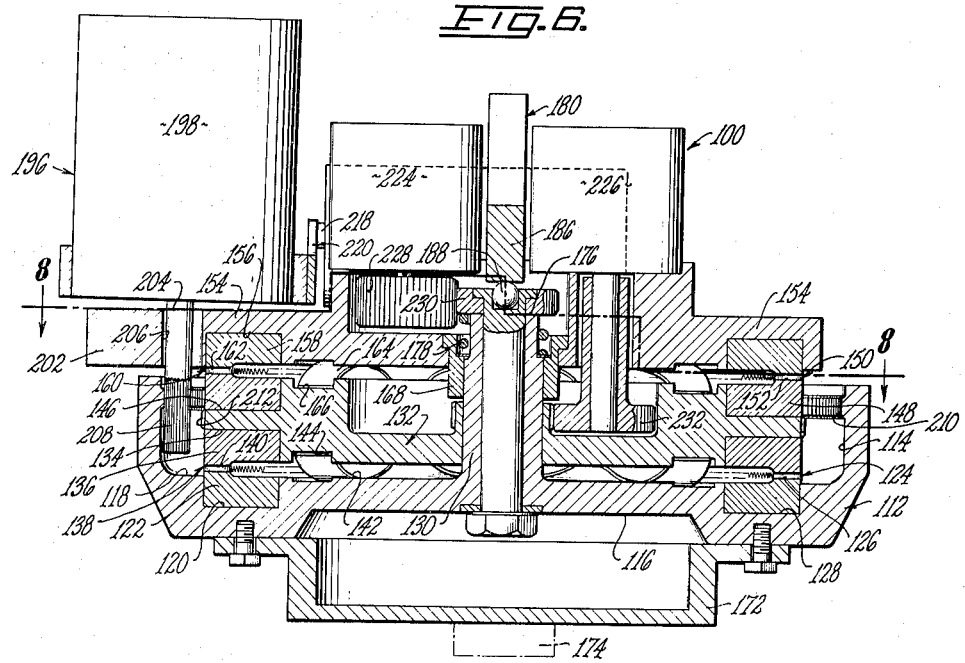
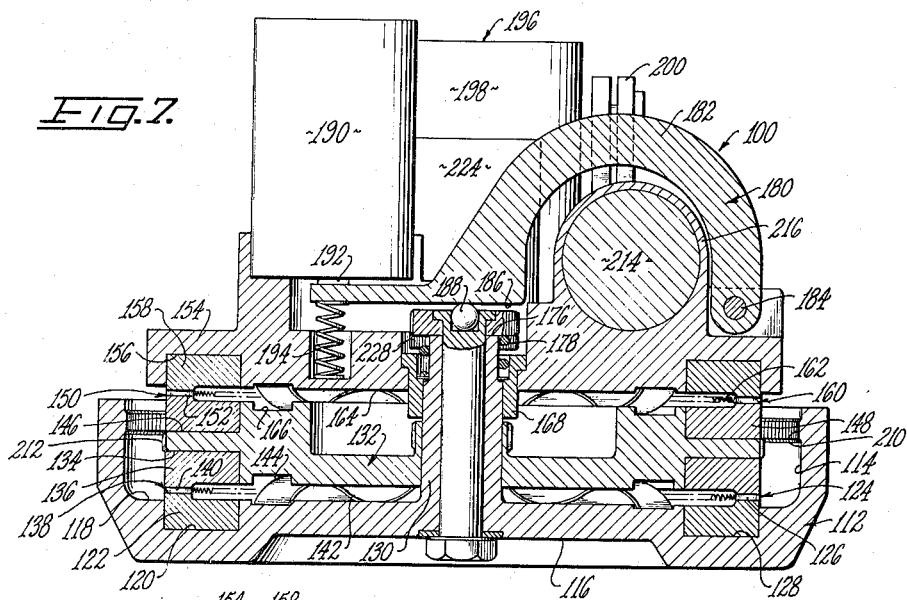
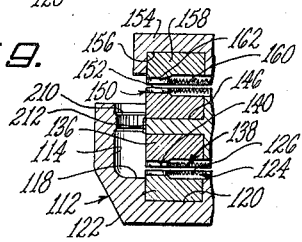

United States Patent Office 3,246,543
Patented Apr. 19, 1966

3,246,543
INDEXING FIXTURE
Donald E. Davidson, La Habra, and Richmond J. Hoch, El Monte, Calif., assignors to Davidson Optronics, Inc., West Covina, Calif., a corporation of California
Filed July 17, 1963, Ser. No. 295,779
12 Claims. (Cl. 74—826)

This invention relates generally to indexing devices and particularly to an improved indexing fixture for selectively and accurately locating an object in different predetermined positions.

In many technological procedures, the ability to selectively and accurately locate an object in different predetermined positions is an advantage or a requirement. The devices which are used for such purposes are commonly referred to an indexing fixtures.

Generally speaking, indexing fixtures are of two basic types, to wit, progressive and stepped. A progressive indexing fixture is equipped with a suitably calibrated scale or measuring device which, in effect, measures the travel of the indexable member of the fixture. In this type of fixture, the indexable member is located in a desired position by adjusting the member until the scale or measuring device reads the position desired. Accordingly, the number of possible positions in which the member may be located is infinite, the indexing accuracy of the fixture being dependent, of course, on the accuracy with which the position of the indexable member may be read and interpolated.

A stepped indexing fixture, on the other hand, has a fixed number of discrete index positions. In this type of fixture, the indexable member and its supporting structure have means which interengage to positively and accurately locate the member in each of its index positions.

The progressive indexing figure has several inherent deficiencies which the stepped fixture overcomes. The progressive fixtures, for example, are difficult and slow to set with any degree of accuracy. Also, auxiliary locking means must be provided for locking the indexable member in adjusted position. A further deficiency of the progressive indexing fixtures is that wear in the bearings which support the indexable member during its indexing movement adversely affects the indexing accuracy of the fixture.

As a consequence, a stepped indexing fixture is superior to a progressive indexing fixture for precision indexing operations. The existing stepped indexing fixtures, however, are themselves subject to certain deficiencies. For example, in a typical high precision indexing instrument of the stepped type, the interengaging indexing means on the indexable member and its supporting structure comprise accurately machined serrations or teeth. The number of such indexing teeth which can be accurately machined on any given fixture, and, hence, the number of possible index positions, is obviously limited. For this reason, the number of index positions in the existing stepped indexing fixtures is relatively small. Further, the existing fixtures of this type are not adapted for adjustment from a remote station and, in general, are hand operated.

A general object of the present invention is to provide an improved stepped indexing fixture of the character described.

Another object of the invention is to provide a stepped indexing fixture of the character described which has a substantially greater number of index positions than the existing indexing fixtures and which greater number of index positions, nevertheless, presents no more involved or precise machining operations than those involved in the fabrication of the existing fixtures.

A further object of the invention is to provide a stepped indexing fixture of the character described which can be adjusted to any selected position from a remote control station, if desired.

Yet a further object of the invention is to provide a stepped indexing fixture of the character described which is relatively simple in construction and operation, highly accurate, relatively economical to fabricate, rugged, and otherwise ideally suited to its intended purposes.

Other objects, advantages, and features of the invention will become readily evident to those skilled in the art as the description proceeds.

Briefly, the objects of the invention are attained by providing an indexing fixture equipped with at least three indexing plates. As will be seen, for example, the fixture may have four or more indexing plates. Considering for the moment, however, an indexing fixture with three plates, the latter comprise a center plate and two outer plates situated at opposite sides of the center plate. One outer indexing plate is fixed to the supporting base of the fixture and is a relatively stationary plate. The other outer indexing plate is movable, as is the center plate, and forms the indexable member of the fixture. The stationary plate and the center plate are formed with first sets of interengaging indexing serrations, or teeth, and the center plate and the movable outer plate are formed with second sets of interengaging indexing serrations, or teeth, said teeth being disengageable, by separation of the plates, to permit adjustment of the center plate and the movable outer plate relative to one another and to the stationary plate.

According to the invention, the number of indexing teeth in each first tooth set is different from the number of teeth in each second tooth set. As a consequence, an extremely large number of possible index positions of the movable outer plate, or indexable member, far exceeding, for instance, the number of indexing teeth in each indexing tooth set, is realized by selective relative positioning of the indexing plates. As an example, assume that the indexing fixture is a rotary fixture in which the sets of indexing teeth are arranged in coaxial circular rows. Assume further that the stationary outer plate and the center plate have 81 teeth each, and the center plate and the movable outer plate have 80 teeth each. If the outer movable plate is advanced one tooth with respect to the center plate, the outer plate will be rotated through one-eightieth of 360°. If the outer plate and the center plate are then advanced in the opposite direction as a unit through the distance of one tooth with respect to the stationary plate, the plates will be rotated through one-eighty first of 360°. The net advance of the outer movable plate is then one-six thousand four hundred eightieth of 360°. The above illustration is intended only as an example, of course, of the possible number of indexing teeth and mode of operation of the present indexing fixture.

According to the preferred practice of the invention, the indexing plates are axially separated, re-engaged, and relatively rotated by remotely controllable means, and the indexing fixture is equipped with remote indicating means for providing course readings of the positions of the indexing plates.

Certain presently preferred embodiments of the invention will now be described by reference to the attached drawings, wherein:

FIG. 6 is an enlarged section taken on line 6—6 in FIG. 3;

FIG. 7 is a section taken on line 7—7 in FIG. 6;

FIG. 9 is a detail view of the indexing teeth on the indexing plates of the fixtures showing the teeth disengaged to permit relatives angular adjustment of the plates.

Figure 1:
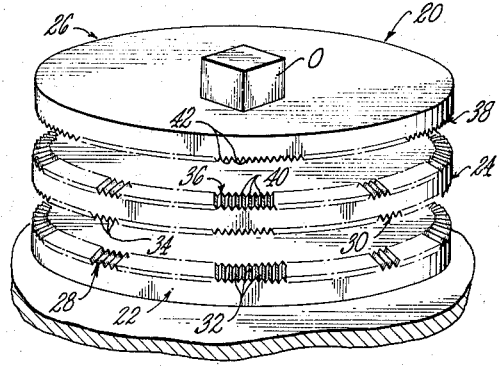
FIG. 1 is a perspective view of a simple manually operated rotary indexing fixture according to the invention, the indexing plates of the fixture being shown as separated to permit relative angular adjustment thereof.
Figure 2:
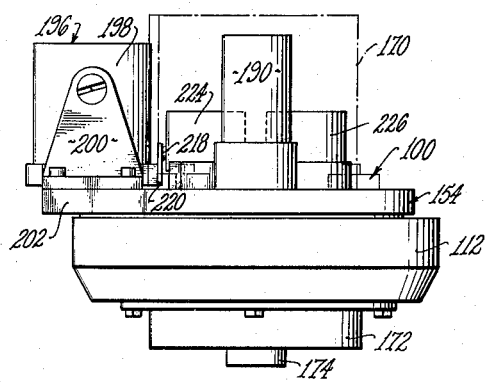
FIG. 2 is a view in side elevation of a power operated rotary indexing fixture according to the invention.
Figure 3:
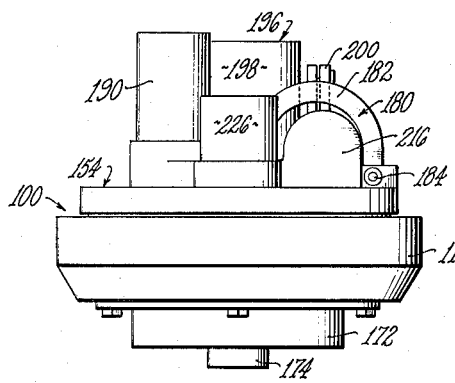
FIG. 3 is a right-hand side view of the indexing fixture in FIG. 2.
Figure 4:
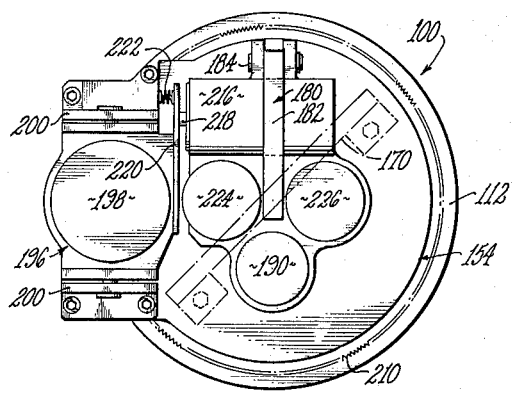
FIG. 4 is a top plan view of the indexing fixture in FIG. 2.
Figure 8:
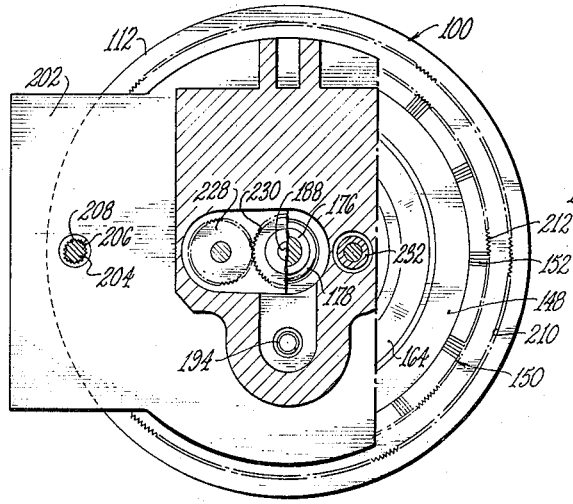
FIG. 8 is a section taken on line 8—8 in FIG. 6.
Figure 5:
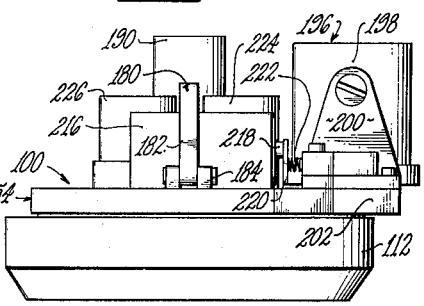
FIG. 5 is a rear view of the indexing fixture in FIG. 2.

Reference is made first to FIG. 1 illustrating a simplified version of the present indexing fixture. The fixture 20 illustrated comprises three indexing plates 22, 24 and 26. The outer or lower plate 22 and the center plate 24 have coaxial circular sets or rows 28 and 30 of radial indexing serrations or teeth 32 and 34, respectively. Tooth rows 28 and 30 have the same diameter and the same number of teeth so that when the plates 22 and 24 are placed in contact, the teeth 32 and 34 mesh to lock the latter plates against relative rotation.

The center plate 24 and the other outer, or upper, plate 26 have coaxial circular rows 36 and 38 of radial indexing serrations or teeth 40 and 42, respectively. Tooth rows 36 and 38 have the same diameter and the same number of teeth so that when the plates 24 and 26 are placed in contact, the teeth 40 and 42 mesh to lock the latter plates against relative rotation.

Thus, when all three indexing plates 22, 24 and 26 are disposed in contact with one another, the plates are locked against relative rotation. The indexing teeth, when meshed, act to maintain the plates in coaxial alignment so that there is no need to provide a central bearing shaft for the plates, although one may be provided, if desired. The plates may be rotated with respect to one another by separating all three plates, as shown in FIG. 1. Alternatively, the center plate and one outer plate may be retained in contact and separated from the third plate, and then rotated as a unit with respect to the third plate. The indexing teeth 32, 34 and 40, 42, of course, define a series of discrete relative angular positions for the indexing plates. These positions are hereinafter referred to as index positions.

Thus, the coacting indexing teeth 32 and 34 on the lower and center indexing plates 22 and 24 define a series of index positions for these plates equal in number to the number of teeth in each tooth row 36 and 38. Similarly, the coacting indexing teeth 40 and 42 on the center and upper indexing plates 24 and 26 define a series of index positions for these plates equal in number to the number of teeth in each tooth row 36 and 38.

In practice, the simple indexing fixture is positioned with its axis vertical, as shown. If the fixture were equipped with a central bearing post for the indexing plates and with means for releasably retaining the plates in contact, as in the later described form of the invention, the fixture could be mounted in any position. In this case, either the upper plate or lower plate of the fixture could be considered to be the relatively stationary plate or supporting base of the fixture, or, alternatively, both the upper and lower plates could be rotatable, as where these plates are secured to two relatively rotatable members to be indexed relative to one another.

In the simple indexing fixture shown in FIG 1, however, the lower plate 22 will be assumed to be fixed and the upper plate 26 will be assumed to comprise a table for supporting an object O to be indexed to different angular positions. In practice, of course, the object would be secured to the upper plate, or table, by suitable means, not shown.

The primary feature of the present invention resides in the fact that the number of indexing teeth in the tooth rows 28 and 30 is different from the number of teeth in the tooth rows 36 and 38. As explained below, this difference in the number of teeth affords the present indexing fixture with a large number of possible index positions far exceeding, for example, the sum of the number of index positions of the lower and center plates and the center and upper plates.

Let us assume now that $N_1$ equals the number of indexing teeth in each lower tooth row 28, 30 and that $N_2$ equals the number of indexing teeth in each upper tooth row 36, 38. Let us further assume that $N_1 > N_2$. Under these conditions, it is evident that if the upper indexing plate 26 is separated from the center plate 24 and rotated through the distance of one tooth 40, 42, the angle $\theta$ of rotation of the upper plate is $$\theta = \frac{1}{N_2}(360°) \qquad (1)$$

If the upper and center plates are now rotated as a unit in the opposite direction through the distance of one tooth 32, 34 with respect to the lower indexing plate 22, the angle $\phi$ of rotation of the upper plate in the latter direction is $$\phi = \frac{1}{N_1}(360°) \qquad (2)$$

The net angle of rotation of the upper plate is then $$\theta - \phi = \left(\frac{1}{N_2} - \frac{1}{N_1}\right)360° \qquad (3)$$

Suppose now that the upper plate is rotated through a number of teeth equal to R and the upper and center plates are then rotated as a unit through the same number of teeth with respect to the lower plate. The net angle of rotation of the upper plate is then $$\theta_R - \phi_R = \left(\frac{R}{N_1} - \frac{R}{N_2}\right)360° = R\left(\frac{1}{N_1} - \frac{1}{N_2}\right)360° \qquad (4)$$

Thus, if the above method of indexing the upper plate is carried out starting with $R=1$ and continuing through the series $R=2$, $R=3$, and so on, it is evident that the upper indexing plate will, in effect, be stepped through a series of successive index positions, the $\alpha$ between which is $$\alpha = \left(\frac{1}{N_2} - \frac{1}{N_1}\right)360° = \frac{(N_1 - N_2)}{N_1 N_2}360° \qquad (5)$$

Let us assume that $N_1 = 81$ teeth and $N_2 = 80$ teeth. Then the angle between successive index position is $$\alpha = \left[\frac{81-80}{(81)(80)}\right]360° = \frac{(1)}{6480}360° \qquad (6)$$

= 200 seconds of arc.

In other words, with only 81 indexing teeth coacting between the lower and center indexing plates and only 80 indexing teeth coacting between the center and upper plates, the present indexing fixture attains 6480 index positions. Thus, the quantity $N_1 N_2$ equals the total number of index positions in an indexing fixture having indexing teeth equal in number to $N_1$ and $N_2$, respectively.

It is evident, therefore, that other numbers of indexing teeth other than 80 and 81 could be used. One important advantage of the present fixture is, of course, that a relatively few number of indexing teeth, such as the 81 teeth in the present example, are relatively easily machined with the accuracy required in an indexing fixture of the present kind. It is for this reason that the number of indexing teeth on each indexing plate should be kept small. Assume, however, that the number of index positions desired would result in an excessively large number of indexing teeth on each indexing plate. According to the present invention, this problem is avoided by simply employing a larger number of indexing plates. In this case, the additional plate or plates would have a different number of indexing teeth than the remaining plates. For instance, an indexing fixture with four indexing plates might have 81 teeth, 80 teeth, and 79 teeth on its respective indexing plates, in which case the number of indexing positions is equal to the product of the three tooth numbers.

Reference is now made to FIGS. 2–9 which illustrate an automated version of the present indexing fixtures. The indexing fixture 100 illustrated in these latter figures comprises a lower indexing plate 112 having a coaxial circular recess 114 extending into its upper face. The undersurface of this plate is relieved at 116. The bottom wall 118 of the recess 114 is formed with an annular coaxial channel or groove 120. In this groove is fixed an annular indexing ring insert 122. On the upper side of the ring insert 122 is a coaxial circular row 124 of indexing serrations or teeth 126. The row of indexing teeth 126 will be observed to be raised slightly above the upper surfaces 128 of the indexing plate 112 and ring insert 122 and to be substantially narrower than the body of the ring insert.

Upstanding from the bottom wall 118 of the plate 112 is a coaxial circular bearing post 130. Rotatably and slidably mounted on this post is a second indexing plate 132. Indexing plate 132 has a lower annular coaxial groove or recess 134 in which is fixed an indexing ring insert 136. The underside of this insert has a coaxial circular row 138 of radial indexing serrations or teeth 140 which project below the undersurfaces of the insert 136 and the indexing plate 132. The circular rows 124 and 138 of indexing teeth have the same diameter, whereby the indexing teeth 126 and 140 are movable into meshing engagement by axial movement of the indexing plate 132 toward the indexing plate 112. A wave spring 142 situated between these plates, and seating in a coaxial annular groove 144 in the undersurface of plate 132, urges the teeth 126 and 140 apart.

In the upper surface of the indexing plate 132 is a coaxial annular groove 146 in which is fixed a second indexing ring insert 148. The upper surface of this insert has a raised coaxial circular row 150 of radial indexing serrations or teeth 152 which project above the upper surfaces of the insert 148 and indexing plate 132.

Above the indexing plate 132 is a third indexing plate 154. In the undersurface of the plate 154 is a coaxial annular groove 156 in which is fixed an indexing ring insert 158. The lower surface of this insert is formed with a coaxial circular row 160 of radial indexing serrations or teeth 162 which project below the undersurfaces of insert 158 and indexing plate 154. Circular rows 150 and 160 of indexing teeth have the same diameter, whereby the indexing teeth 152 and 162 are movable into meshing engagement by axial movement of the indexing plate 154 toward the indexing plate 132. A wave spring 164 situated between the plates 132 and 154, and seating in a coaxial annular groove 166 in the plate 132, urges the indexing teeth 152 and 162 apart.

Indexing plate 154 has a central bearing 168 slidably and rotatably fitted on the bearing post 130. Thus, plate 154 is adapted for axial movement toward and away from, and rotation with respect to, the plate 132.

It is evident at this point, therefore, that when the indexing plates 112, 132 and 154 are separated by the wave springs 142 and 164, the plates are freely rotatable with respect to one another. The plates are locked against relative rotation by moving the plates axially toward one another, against the action of springs 142 and 164, to engage the indexing teeth 126 and 140 on the plates 112 and 132 and the indexing teeth 152 and 162 on the plates 132 and 154. In the ensuing description, the indexing plates 112 and 154 are referred to in places as the lower and upper indexing plates, or simply lower and upper plates, and the indexing plate 132 is referred to as the center indexing plate, or simply center plate. It is evident, of course, that if the indexing fixture is mounted with its axis horizontal, rather than vertical, as shown, the plates 112 and 154 become simply outer indexing plates.

Depending upon each particular application of the indexing fixture, either the upper plate 154 or the lower plate 112 may be fixed. In the illustrated fixture, the upper plate 154 is intended to be fixed and, to this end, is equipped with a mounting bracket 170 (FIG. 2) for attachment to a supporting structure. The upper plate thus forms, in effect, a supporting base for the fixture. The lower indexing plate 112 is equipped with a bracket 172 for connection to a part 174 to be indexed. It is evident, of course, that the fixture might be used to effect relative angular positioning of two relatively rotatable objects, in which case both the upper and lower indexing plates would be movable. For simplicity of discussion, however, the upper plate 154 is considered to be stationary.

Acting between the fixed upper indexing plate 154 and a shoulder 176 on the bearing post 130 carried by the lower rotatable indexing plate 112 is a compression spring 178 which normally overcomes the force of the wave springs 142 and 164 and retains the indexing teeth 126, 140 and 152, 162 in engagement. The three indexing plates are thereby normally locked against relative rotation. Carried on the fixed upper indexing plate 154 is an actuator 180 for separating the plates. While various types of actuators may be used for this purpose, the actuator shown comprises an arm or lever 182, one end of which is pivoted at 184 on the upper indexing plate 154. The other end of the arm has a thrust surface 186 which seats against a ball bearing 188 carried by the adjacent end of the bearing post 130. Also included in the actuator 180 is a solenoid 190, the plunger 192 of which seats against the latter end of the actuator arm 182. When the solenoid is energized, its plunger 192 is thrust against the arm, thereby forcing the latter against the bearing post 130 to shift the lower indexing plate 112 away from the upper indexing plate 154. The wave springs 142 and 164 maintain the center plate 132 centered between the upper and lower plates, whereby when the lower plate is moved, as just described, the center plate is separated from both the upper and lower plates.

Thus, energizing of the actuator solenoid 190 effects separation of the three indexing plates 112, 132 and 154, thereby conditioning the latter for relative rotation. When the solenoid is de-energized, the spring 178 returns the plates to their normally engaged positions, wherein the indexing teeth 126, 140 and 152, 162 engage to lock the plates against relative rotation. A spring 194 acting between the upper plate 154 and the actuator arm 182 biases the latter toward its inoperative position.

Indicated at 196 is a drive mechanism for selectively rotating the center and lower indexing plates 112 and 132. While various types of drive mechanisms may be used for this purpose, the illustrated mechanism comprises a reversible motor 198 which is pivotally mounted between two upstanding brackets 200 attached to an extension 202 on the fixed upper indexing plate 154. The shaft 204 of the motor extends through an enlarged hole 206 in the upper plate into the cavity 114 in the lower plate 112. The lower end of the motor shaft 204 forms a pinion 208.

The pivotal mounting for the motor 198 is so arranged that the motor shaft 204 swings in a radial plane containing the central axis of the indexing fixture. Formed about the inner surface of the lower indexing plate 112 is an integral ring gear 210 with which the motor shaft pinion 208 drivably engages when the motor 198 is pivoted in the clockwise direction in FIG. 6. Formed about the outer edge of the center indexing plate 132 is an integral ring gear 212 with which the motor pinion is drivably engaged by pivoting of the motor in the counterclockwise direction in FIG. 6. Thus, either indexing plate 112 or 132 may be rotated by the motor 198, when the plates are separated, by pivoting the motor in the proper drive position.

Motor 198 is pivoted to its drive positions by means of a motor positioning solenoid 214 mounted in a housing 216 on the upper indexing plate 154. The plunger 218 of this solenoid seats against an arm 220 fixed to the motor, whereby when the solenoid 214 is energized, the motor is pivoted in the clockwise direction in FIG. 6 to its lower plate driving position. When the solenoid 214 is de-energized, a spring 222 acting between one of the motor brackets 200 and the arm 220 returns the motor 198 to its center plate driving position.

Also carried on the upper fixed indexing plate 154 are two indexing plate position transmitters 224 and 226, comprising, for example, potentiometers. Transmitter 224 has a shaft mounting a pinion 228 which meshes with gear teeth 230 formed about the bearing post shoulder 176. The rotor of transmitter 224 is, accordingly, angularly positioned in accordance with, and the transmitter generates a signal related to, the relative angular position of the upper and lower indexing plates 154, 112.

Transmitter 226 has a shaft mounting a pinion 232 which meshes with gear teeth on the center indexing plate 132. The rotor of transmitter 226 is, therefore, angularly positioned in accordance with, and the transmitter generates a signal related to, the relative angular position of the upper and center indexing plates.

As in the earlier form of the invention, the number of indexing teeth in each of the sets 126 and 140 is different from the number of indexing teeth in each of the sets 152 and 162. Thus, each of the sets 126, 140 may have 80 teeth and each of the sets 152, 162 may have 81 teeth, for example, as in the earlier form of the invention.

In operation of the indexing fixture, energizing of the actuator solenoid 190 disengages the three indexing plates 112, 132 and 154 to condition the latter for relative rotation thereof. The indexing plate drive motor 198 is then located in its lower or center plate drive positions by its positioning solenoid 214, and the motor is energized to drive the lower plate 112 and/or the center plate 132, as the case may be. In this way, the three indexing plates 112, 132 and 154 may be rotated to any relative angular position. The position transmitters 224 and 226 sense the angular positions of the plates 132 and 112, respectively, with respect to the upper plate 154 and transmit this information to the operator's station for the fixture. This station may be located any desired distance from the indexing fixture itself and is provided with means for operating, as well, the indexing plate drive motor 198 and its positioning solenoid 214.

When the indexing plates have been driven to a desired relative angular position in the manner described above, the actuator solenoid 190 is de-energized, whereby the indexing plates are returned to engagement by the spring 178 and are thereby locked in fixed relative angular positions by interengagement of their indexing teeth. Since the indexing teeth on the upper and lower indexing plates 112 and 154 and the respective indexing teeth on the center indexing plate 132 differ in number, the indexing teeth are effective to provide the fixture with a large number of possible index positions for the indexable plate 112 is precisely the same way as described earlier in connection with the simple indexing fixture of FIG. 1. Accordingly, it is not necessary to describe, in greater detail, the action of the indexing teeth on the fixture of FIGS. 2-9.

Clearly, therefore, the invention herein described and illustrated is fully capable of attaining the several objects and advantages preliminarily set forth.

While certain presently preferred embodiments of the invention have been disclosed, they are intended to be purely illustrative in nature, it being obvious that numerous modifications in the design, arrangement of parts, and instrumentalities of the invention are possible within the spirit and scope of the following claims.

What is claimed is:

1. An indexing fixture comprising:
  an indexing plate set including a first plate, a second plate at one side of said first plate, and a third plate at the opposite side of said first plate;
  means operatively connecting said plates for relative movement thereof along given parallel direction lines;
  first sets of coacting indexing teeth on said first and second plates adapted for selective meshing engagement to locate said latter plates in predetermined relative index positions spaced in the direction of relative movement of the plates;
  second sets of coacting indexing teeth on said first and third plates adapted for selective meshing engagement to locate said latter plates in predetermined relative index positions spaced in the direction of relative movement of the plates;
  said teeth being disengaged by separation of said plates in a direction normal to said direction lines to permit relative movement of the plates from one index position to another;
  the number of teeth in said first tooth sets being different from the number of teeth in said second tooth sets;
  springs acting between said plates for urging the latter apart;
  means coacting between said plates for retaining said plates in meshing relation against the action of said springs;
  means for effecting separation of said first plate from said second and third plates under the action of said springs; and
  means for selectively driving said plates in relative movement when the plates are separated.

2. An indexing fixture comprising:
  an indexing plate set including a first plate, a second plate at one side of said first plate, and a third plate at the opposite side of said first plate;
  means operatively connecting said plates for relative movement thereof along given parallel direction lines;
  first sets of coacting indexing teeth on said first and second plates adapted for selective meshing engagement to locate said latter plates in predetermined relative index positions spaced in the direction of relative movement of the plates;
  second sets of coacting indexing teeth on said first and third plates adapted for selective meshing engagement to locate said latter plates in predetermined relative index positions spaced in the direction of relative movement of the plates;
  said teeth being disengaged by separation of said plates in a direction normal to said direction lines to permit relative movement of the plates from one index position to another;
  the number of teeth in said first tooth sets being different from the number of teeth in said second tooth sets;
  first springs acting between said plates for urging the latter apart;
  means including second spring means for retaining said plates in meshing relation against the action of said first springs;
  means for effecting separation of said plates against the action of said second spring means and under the action of said first springs; and
  means for selectively driving said plates in relative movement when the plates are separated.

3. An indexing fixture comprising:
  a set of circular indexing plates including a first plate having a coaxial bearing post, a second plate slidably and rotatably fitted on said post, and a third plate slidably and rotatably fitted on said post between said first and second plates;
  first sets of coacting indexing teeth on said first and third plates adapted for selective meshing engagement to locate said latter plates in predetermined relative angular index positions;

second sets of coacting indexing teeth on said second and third plates adapted for selective meshing engagement to locate said latter plates in predetermined relative angular index positions;

said teeth being disengaged by axial separation of said plates to permit relative movement of the latter from one index position to another;

the number of teeth in said first tooth sets being different from the number of teeth in said second tooth sets;

first springs acting between said plates for urging the latter apart;

a second spring for urging said plates into meshing relation against the action of said first springs; and means for selectively urging said first and second plates apart against the action of said second spring.

4. An indexing fixture comprising:

a set of circular indexing plates including a first plate having a coaxial bearing post, a second plate slidably and rotatably fitted on said post, and a third plate slidably and rotatably fitted on said post between said first and second plates;

first sets of coacting indexing teeth on said first and third plates adapted for selective meshing engagement to locate said latter plates in predetermined relative angular index positions;

second sets of coacting indexing teeth on said second and third plates adapted for selective meshing engagement to locate said latter plates in predetermined relative angular index positions;

said teeth being disengaged by axial separation of said plates to permit relative movement of the latter from one index position to another;

the number of teeth in said first tooth sets being different from the number of teeth in said second tooth sets;

first springs acting between said plates for urging the latter apart;

a second spring acting between said post and said second plate for urging said plates into meshing relation against the action of said first springs; and means carried on said second plate and operatively engaging said bearing post for selectively urging said plates apart against the action of said second spring.

5. The subject matter of claim 4 wherein:

said last-mentioned means comprises an arm pivoted on said second plate and engaging said bearing post, and a solenoid on said second plate adapted to operate against said arm to separate said plates.

6. An indexing fixture comprising:

an indexing plate set including a first indexing plate, a second indexing plate at one side of said first plate, and a third indexing plate at the opposite side of said first plate, said plates being relatively movable along given parallel direction lines;

first sets of coacting indexing teeth on said first and second plates adapted for selective meshing engagement to locate said latter plates in predetermined relative index positions spaced in the direction of relative movement of the plates;

second sets of coacting indexing teeth on said first and third plates adapted for selective meshing engagement to locate said latter plates in predetermined relative index positions spaced in the direction of relative movement of the plates;

said teeth being disengaged by separation of said plates to permit relative movement of the latter from one index position to another;

the number of teeth in said first tooth sets being different from the number of teeth in said second tooth sets;

means for selectively moving said plates into meshing relation and separating said plates;

a driving shaft; and means for selectively drivably engaging said shaft with two of said plates for selectively driving the latter plates relative to one another and to the remaining plate.

7. An indexing fixture comprising:

an indexing plate set including a first indexing plate, a second indexing plate at one side of said first plate, and a third indexing plate at the opposite side of said first plate, said plates being relatively movable along given parallel direction lines;

first sets of coacting indexing teeth on said first and second plates adapted for selective meshing engagement to locate said latter plates in predetermined relative index positions spaced in the direction of relative movement of the plates;

second sets of coacting indexing teeth on said first and third plates adapted for selective meshing engagement to locate said latter plates in predetermined relative index positions spaced in the direction of relative movement of the plates;

said teeth being disengaged by separation of said plates to permit relative movement of the latter from one index position to another;

the number of teeth in said first tooth sets being different from the number of teeth in said second tooth sets;

means for selectively moving said plates into meshing relation and separating said plates; and a motor with a drive shaft mounted on one of said plates for movement between a first position of driving engagement of said shaft with one remaining plate and a second position of driving engagement of said shaft with the other remaining plate, whereby said motor is operable to drive said two remaining plates relative to one another and to said one plate when said plates are separated.

8. An indexing fixture comprising:

three circular indexing plates including a center plate and two outer plates at opposite sides of said center plate;

means operatively connecting said plates for relative rotation and relative axial movement thereof;

first sets of coacting indexing teeth on said center plate and one outer plate adapted for selective meshing engagement to locate said latter plates in predetermined relative angular index positions;

second sets of coacting indexing teeth on said center plate and the other outer plate adapted for selective meshing engagement to locate said latter plates in predetermined relative angular index positions;

the number of teeth of said first tooth sets being different from the number of teeth of said second tooth sets;

means for selectively moving said plates into meshing relation and separating said plates;

a first ring gear about one of said plates;

a second ring gear about another of said plates; and a motor including a shaft pinion mounted on the remaining plate for movement between a first position of driving engagement of said pinion with one ring gear and a second position of driving engagement of said pinion with the other ring gear, whereby said motor is operable to selectively rotate two of said plates relative to the third plate.

9. The subject matter of claim 7 including:

means for selectively shifting said motor between said driving positions thereof.

10. The subject matter of claim 7 including:

means including a solenoid for selectively shifting said motor between said driving positions thereof.

11. An indexing fixture comprising:

an indexing plate set including a first plate, a second plate at one side of said first plate, and a third plate at the opposite side of said first plate;

means rotatably connecting said plates for relative rotation thereof on substantially a common axis;

first sets of coacting indexing teeth on said first and second plates adapted for selective meshing engagement to locate said latter plates in predetermined relative angular index positions;

second sets of coacting indexing teeth on said first and third plates adapted for selective meshing engagement to locate said latter plates in predetermined relative angular index positions;

said teeth being disengaged by axial separation of said plates to permit relative rotation of said plates from one index position to another;

the number of teeth in said first tooth sets being different from the number of teeth in said second tooth sets;

means for selectively moving said plates into meshing engagement and separating said plates;

means for selectively driving said plates in relative rotation when the plates are separated;

a first transmitter operatively connected to a first pair of said plates for generating an output function related to the relative angular position of said plate pair; and a second transmitter operatively connected to a second pair of said plates for generating an output function related to the relative angular position of said second plate pair.

12. An indexing fixture according to claim 11 wherein:

said first transmitter is mounted on a given plate and includes a rotary input member drivably coupled to one of the remaining plates for generating an output function related to the relative angular position of said given plate and said one remaining plate; and said second transmitter is mounted on said given plate and includes a rotary input member drivably coupled to the other remaining plate for generating an output function related to the relative angular position of said given plate and said other remaining plate.

References Cited by the Examiner

UNITED STATES PATENTS

| | | | |
|---|---|---|---|
| 3,144,593 | 8/1964 | Ganowsky | 74—96 X |
| 3,146,640 | 9/1964 | Moncrieff | 74—826 |

BROUGHTON G. DURHAM, *Primary Examiner.*